United States Patent
Dörr

(10) Patent No.: US 6,735,599 B1
(45) Date of Patent: May 11, 2004

(54) METHOD FOR ACCESSING DATA IN NETWORK ELEMENTS

(75) Inventor: Franz Dörr, Hadersdorf (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/806,590

(22) PCT Filed: Sep. 9, 1999

(86) PCT No.: PCT/EP99/06662
§ 371 (c)(1),
(2), (4) Date: Mar. 30, 2001

(87) PCT Pub. No.: WO00/19738
PCT Pub. Date: Apr. 6, 2000

(30) Foreign Application Priority Data

Sep. 30, 1998 (DE) .......................... 198 18 505

(51) Int. Cl.[7] .............................. G06F 17/30
(52) U.S. Cl. ............. 707/103 R; 707/102; 707/104.1; 709/201; 709/223; 709/230
(58) Field of Search ............... 707/100, 102, 707/104.1, 103 R; 709/221, 222, 223, 230

(56) References Cited

U.S. PATENT DOCUMENTS

| | | | |
|---|---|---|---|
| 5,317,742 A | * 5/1994 | Bapat ........................ 707/3 |
| 5,530,800 A | * 6/1996 | Larsson et al. ............. 707/202 |
| 5,592,620 A | 1/1997 | Chen et al. .................. 709/223 |
| 5,684,988 A | 11/1997 | Pitchaikani et al. ..... 707/104.1 |
| 5,752,247 A | 5/1998 | Henderson .................. 707/102 |
| 5,799,153 A | * 8/1998 | Blau et al. .................. 709/223 |
| 5,941,978 A | * 8/1999 | Finni .......................... 709/201 |
| 6,070,188 A | * 5/2000 | Grant et al. ................. 709/223 |

FOREIGN PATENT DOCUMENTS

| | | |
|---|---|---|
| WO | WO 95/34975 | 12/1995 |
| WO | WO 96/24899 | 8/1996 |
| WO | WO97/00567 | 1/1997 |

OTHER PUBLICATIONS

Yang, Zhihong et al., "Object–Oriented Protocol Implementation—Signaling System 7", 2000 IEEE International Conference on Commnunications, ICC 2000, Jun. 18, 2000, pp. 571–575, vol. 1.*

* cited by examiner

*Primary Examiner*—Shahid Alam
(74) *Attorney, Agent, or Firm*—Bell Boyd & Lloyd LLC

(57) ABSTRACT

A method for accessing data which is present in object-oriented form as object models with a tree structure in network elements in a communications network, and the data traffic relating to network administrations is at least partially carried out using an object-oriented protocol in the network, in which case, when an access request for an object by an operating system arrives, the data of a predetermined subset of subobjects is written to a file and is then sent in combined form to the operating system.

7 Claims, 2 Drawing Sheets

METHOD FOR ACCESSING DATA IN NETWORK ELEMENTS

BACKGROUND OF THE INVENTION

1. Field of the Invention

The present invention relates to a method for accessing data which is present in object-oriented form as object models with a tree structure in network elements in a communications network, and the data traffic relating to network administration is at least partially carried out using an object-oriented protocol in the network.

2. Description of the Prior Art

Communications networks generally include not only the actual subscriber network for network channel connections, but also a signaling network and a management network. One system which is considered, by way of example, in the context of the present invention is the "Integrated Service Digital Network", referred to as ISDN for short in the following text; another being the broadband ISDN based on the ATM (Asynchronous Transfer Mode) transmission technique. For maintenance and operational tasks, for example editing of data in switching centers, setting up or modifying new service features and routine maintenance, the Telecommunications Management Network, TMN for short, is provided in the ISDN system and is documented in CCITT Recommendation M.30, Geneva: ITU 1989. In this case, network elements, for example switching centers, are accessed and administered via object-oriented interfaces, in particular via the so-called Q3 interfaces and a corresponding protocol, as defined in the ITU Standards Series X.7xx (Geneva, CCITT).

Operating systems (=OS) are likewise connected via Q3 interfaces to the management network, such as network elements, in this case especially switching centers. The operating systems generally have workstations on which an operator can carry out the necessary inputs and checks with the assistance of an operator terminal; that is, they can be connected to a coordination processor via a Q3 platform in the network element.

The central component in the coordination processor of a network element, in this case in its Q3 platform, is a function, for example the Log Control Function, defined in CCITT Recommendation X.735 (ITU 1993), for buffer storage of network element data, such as charge data, statistical data etc. Such data, which is often very extensive, is then intended to be transferred to the operating system, in order then to be used there; for example, for charge calculation. In the method used for data access, an operating system sends a request via the Q3 interface, an M-GET request in the Q3 protocol, to the network element, where each individual data record of the subobjects of an object is sent with its own message (M-GET response in the Q3 protocol), to be precise with a corresponding overhead in the Q3 protocol. Since, as already mentioned, the data stored in the Log Control Function may be very extensive, for example several hundred megabytes, data traffic in the described manner is highly time-intensive.

In the context of an interconnection between a CMIP network (CMIP=Common Management Information Protocol) and various types of repositories which include database systems, a method is known from U.S. Pat. No. 5,752,247 which allows a log agent, which translates CMIP commands into standardized functions for an application-specific interface, to communicate with all types of repositories via a Log Access Library. In this case, a standard access interface to the various repositories is proposed, but this solution proposal does not solve the problem described above.

An object of the present invention is therefore, is to make the access and transmission of data more economic and quicker.

SUMMARY OF THE INVENTION

This object is achieved by a method wherein, when an access request for an object by an operating system arrives, the data of a predetermined subset of subobjects is written to a file and is then sent in combined form to the operating system.

Thanks to the present invention, the data of the subobjects can be transmitted considerably more quickly, particularly if a large number of subobjects each having a relatively small amount of user data are present, since, in the end, only the relatively minor overhead for the protocol for file transfer is incurred de facto for the data of all the subobjects covered, without in any way incurring the Q3 protocol overhead.

The method according to the present invention is particularly flexible if the subset of subobjects is stated in the access request.

On the other hand, it is frequently sufficient and simpler to write all the subobjects of an object to a file when an access request arrives.

The present invention can be used particularly advantageously when the network administration uses the Q3 protocol. In this case, it may simplify the administration process if the access request is made in the context of the Q3 protocol via an M-ACTION command, but the combined data is transferred using an FTP protocol.

However, it is possible and, in many cases, simpler if the access request and the transmission of the combined data take place using the "FTP" protocol.

In order to achieve as great a reduction as possible in the data to be transmitted, it is recommended that only the user data of the subobjects be written to a file.

Additional features and advantages of the present invention are described in, and will be apparent from, the following invention and the Figures.

DETAILED DESCRIPTION OF THE INVENTION

Figure 1:
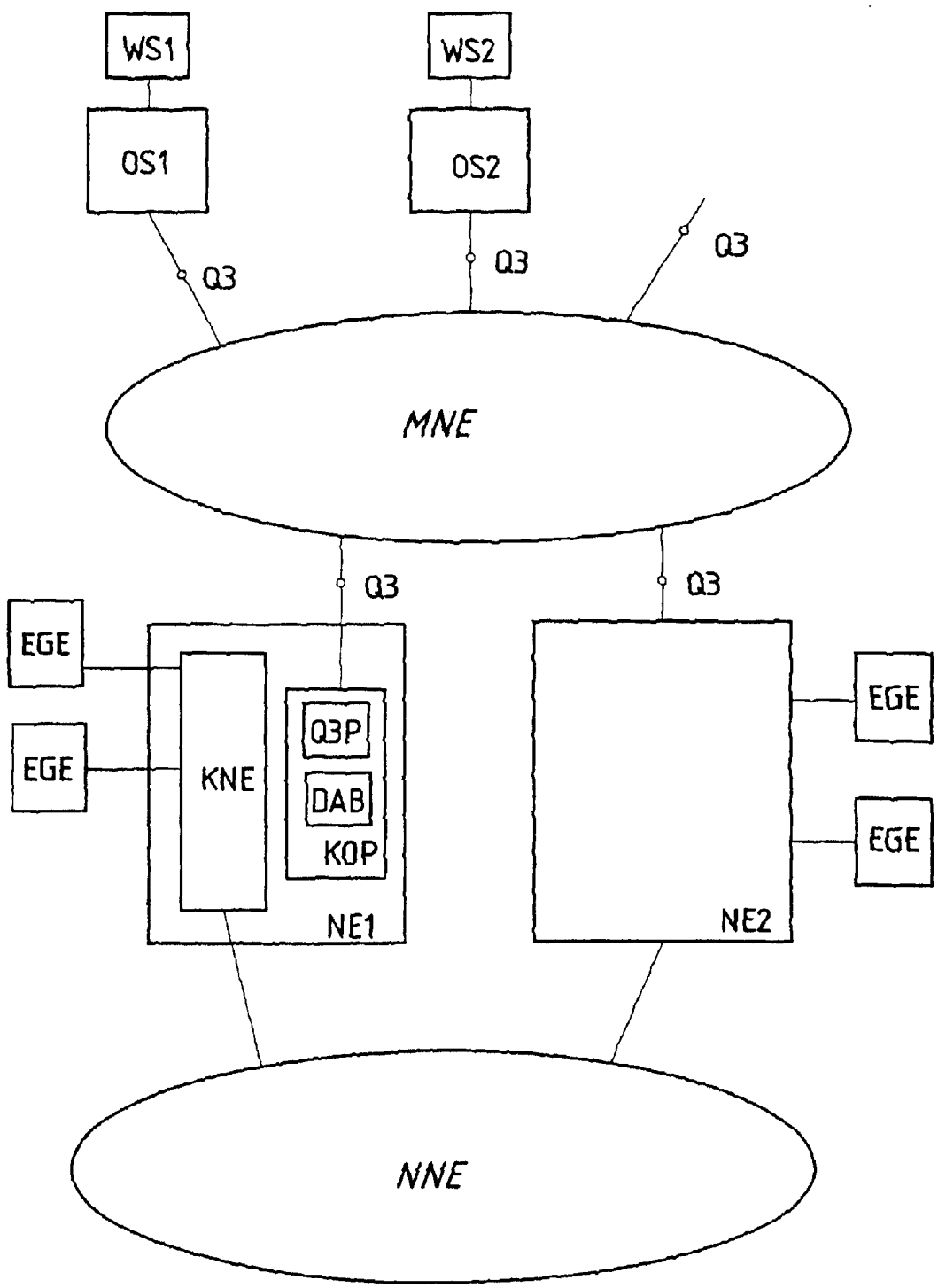
FIG. 1 shows, schematically, a network configuration with network elements and Q3 interfaces.

According to FIG. 1, a telecommunications network has an actual information network NNE, for example an ISDN landline network, with network elements, NE1, NE2, in this example ATM switching centers to which terminals EGE are connected. Furthermore, a management network MNE is set up for operation and maintenance, to which firstly the network elements NE1, NE2 and secondly operating systems OS1, OS2 with workstations WS1, WS2 are connected via Q3 interfaces Q3. In addition to a switching network KNE, a network element, in this case the element NE1, also has a coordination processor KOP with a Q3 platform Q3P and a database DAB. The construction and function of a management network for ISDN are described, for example, in Chapter 8.3 of "ISDN Digital Networks for Voice, Text, Data, Video and Multimedia Communication", Peter Bocker, ISBN 3-540-57431-x.

Figure 2:
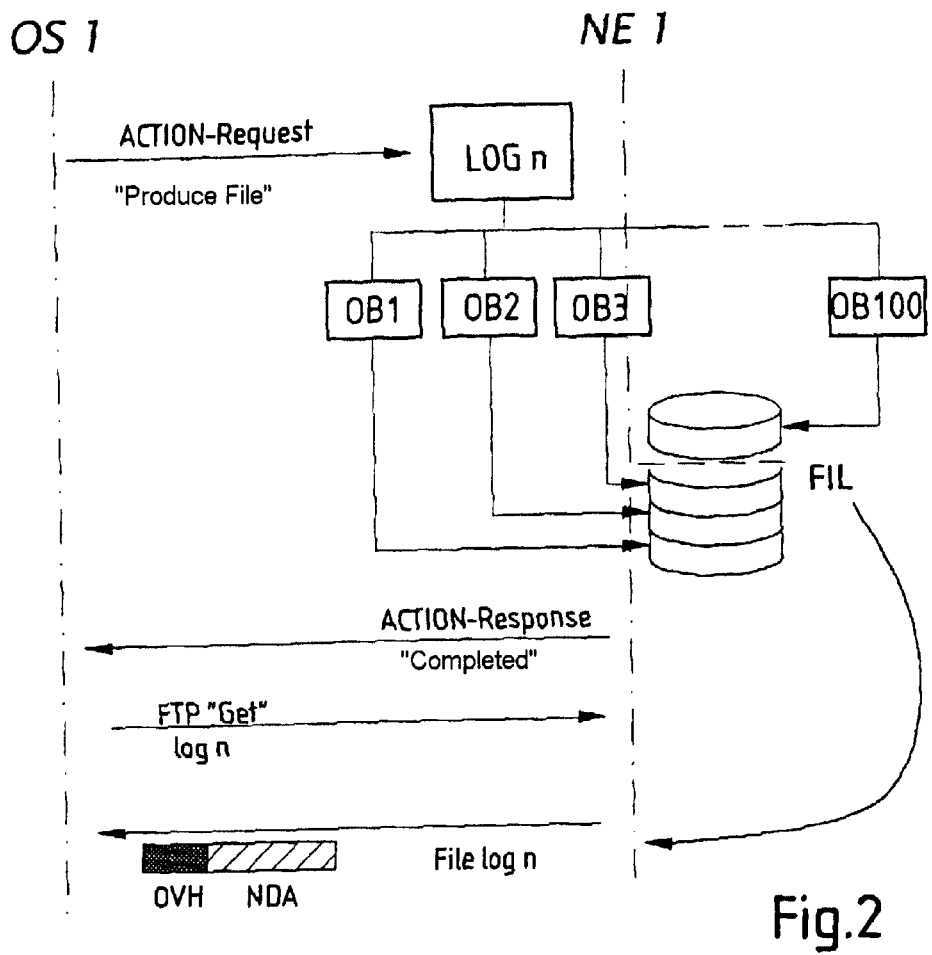
FIG. 2 shows, schematically, the sequence for accessing and transmitting data in a first embodiment of the present invention.

One object of the operating systems OS1, OS2 is, for example, to call up and pass on charge data stored in the database DAB, etc. With reference to FIG. 2, it is assumed that the charge data is in an object LOG n which has subobjects OB1 . . . OB100 which contain the charge data for individual subscriber groups. In general, the data, which also may be other subscriber-specific or connection-specific data, is in the form of object models with a tree structure, which often has complex branches. Apart from the "LOG Control Function" object which is considered here only by way of example, other objects are also normal, such as the "Event Report Function" or the "Hardware Configuration" object.

According to FIG. 2, an ACTION request "Produce File" is sent, for example, from the operating system OS1 via the object-oriented Q3 protocol to the network element NE1. In this context, it should be noted that, in principle, the Q3 protocol recognizes five "Request Types", namely "CREATE", "DELETE", "SET", "GET" and "ACTION" (see CCITT Recommendation X.710), of which the request "ACTION" is only partially standardized, but nevertheless is also freely definable. The request "ACTION" is thus in this case used as a command to set up a file FIL of user data of all the subobjects OB1, OB2 . . . OB100 for the object LOG n.

After completing this task, or once the user data, in this case the charge data from the 10 last three days for example, has been combined in the file FIL an acknowledgement "ACTION response completed" is sent to the operating system OS1. Then, or later, the operating system OS1 can use a command in the standard "FTP" (File Transfer Protocol, specified in RFC 959) protocol, the FTP command "get" logn in FIG. 2, to draw the entire file FIL from the network element NE1. This file contains all the desired data records as user data NDA and the transmission process is considerably more efficient than in the prior art. In the past, each data record was sent together with a Q3 protocol overhead but, according to the present invention, only the FTP protocol overhead OVH is now required for all the data records. It may, of course, be necessary to subdivide depending on the size of the file and the available line capacity, but there is invariably a saving in the amount of data to be transmitted, which is very large especially when the individual data records are relatively small, so that the sum of the overheads provided for them in the conventional Q3 protocol is out of all proportion to the total amount of user data.

Figure 3:
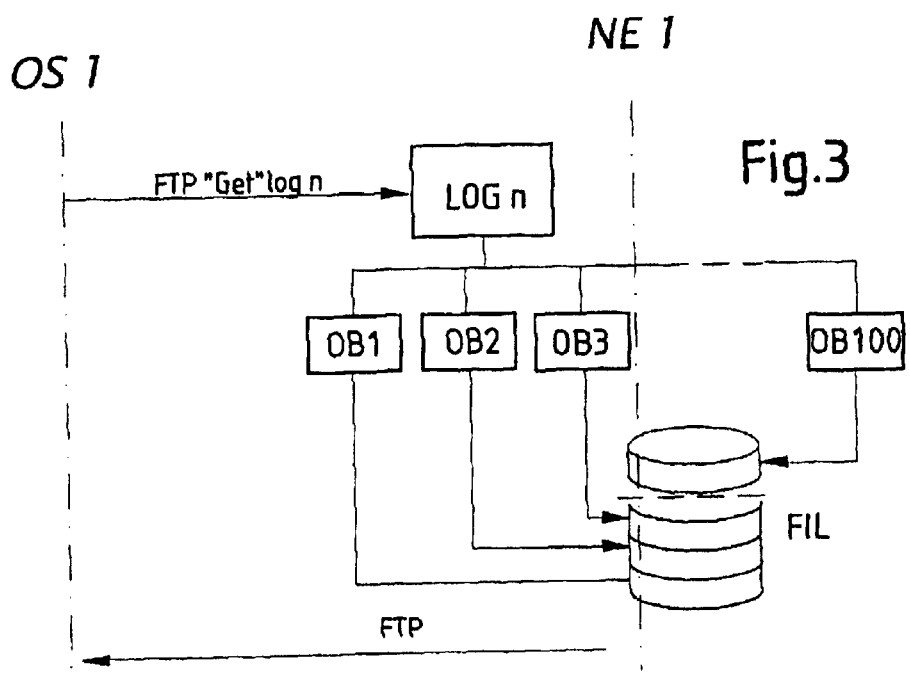
FIG. 3 shows a schematic sequence, similar to that in FIG. 2, for a second embodiment of the present invention.

FIG. 3 shows a variant in which, using the standard FTP protocol, an operating system OS1 sends an access request FTP "get" logn to the network element NE1, in which case this command results in combination of all the subobject data and user data for the object LOG n in a file FIL and subsequent transmission of the entire file FIL, once again in the FTP protocol, to the operator station OS1. In this case no Q3 interfaces would be required—at least for those network elements which are intended for processing data from the Log Control Function.

It is evident that variations are possible within the scope of the present invention, but the combination of a number of subobjects to form a file and the transmission of this file always remain an essential feature.

Indeed, although the present invention has been described with reference to specific embodiments, those of skill in the art will recognize that changes may be made thereto without departing from the spirit and scope of the present invention as set forth in the hereafter appended claims.

What is claimed is:

1. A method for accessing object-oriented data in network elements in a communications network, the method comprising the steps of:

providing that object-oriented data traffic relating to network administration be at least partially carried out using an object-oriented protocol in the communications network;

receiving an access request for an object by an operating system;

writing object-oriented data of a predetermined subset of sub-objects of the object to a file; and sending the object-oriented data of the predetermined subset of sub-objects, in combined form, as combined data to the operating system.

2. A method for accessing object-oriented data as claimed in claim 1, wherein the subset of subobjects is stated in the access request.

3. A method for accessing object-oriented data as claimed in claim 1, wherein the predetermined subset of subobjects includes all subobjects for an object.

4. A method for accessing object-oriented data as claimed in claim 1, wherein the network administration is carried out using a Q3 protocol.

5. A method for accessing object-oriented data as claimed in claim 4, wherein the access request is made in a context of the Q3 protocol via an M-ACTION command, but the combined data is transferred using an FTP protocol.

6. A method for accessing object-oriented data as claimed in claim 1, wherein both the access request and the transmission of the combined data take place using an FTP protocol.

7. A method for accessing object-oriented data as claimed in claim 1, wherein the data includes only user data for the subobjects.

* * * * *